(12) United States Patent
Rankin et al.

(10) Patent No.: US 11,121,855 B2
(45) Date of Patent: *Sep. 14, 2021

(54) SYSTEM AND METHOD FOR SECURE EXCHANGE

(71) Applicant: John Rankin, Morgantown, WV (US)

(72) Inventors: John Rankin, Morgantown, WV (US); Phillip Wayne Coffelt, North Canton, OH (US); Wilberto Nemrod Salazar, Sylmar, CA (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,647

(22) Filed: Feb. 7, 2020

(65) Prior Publication Data

US 2020/0177369 A1 Jun. 4, 2020

Related U.S. Application Data

(63) Continuation of application No. 16/263,007, filed on Jan. 31, 2019, now Pat. No. 10,574,439.

(60) Provisional application No. 62/624,179, filed on Jan. 31, 2018.

(51) Int. Cl.
*H04L 9/00* (2006.01)
*H04L 9/06* (2006.01)
*H04L 9/08* (2006.01)
*G06F 7/58* (2006.01)

(52) U.S. Cl.
CPC .......... *H04L 9/0625* (2013.01); *H04L 9/0869* (2013.01); *G06F 7/582* (2013.01)

(58) Field of Classification Search
CPC ... H04L 63/061; H04L 9/0625; H04L 9/0869; H04L 9/0643; H04L 63/0869; G06F 7/58; G06F 7/582
See application file for complete search history.

(56) References Cited

U.S. PATENT DOCUMENTS

| | | |
|---|---|---|
| 3,688,090 A | 8/1972 | Rankin |
| 5,727,062 A | 3/1998 | Ritter |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Ghazal B Shehni
(74) *Attorney, Agent, or Firm* — Standley Law Group LLP

(57) ABSTRACT

Systems and methods for secure communication are provided. A sender encrypts a first starting block with one of a number of random blocks. The encrypted first starting block is sent to a receiver, which expands it by a random amount. The expanded block is divided into a first expanded block and a second expanded block. A source data block is encrypted with the second expanded block and transmitted to the receiver, where it is decrypted with the decrypted first starting block. The first expanded block replaces the starting block for subsequent transmission.

20 Claims, 4 Drawing Sheets

(56) References Cited

U.S. PATENT DOCUMENTS

| | | |
|---|---|---|
| 7,103,025 B1 | 9/2006 | Choksi |
| 7,734,046 B2 * | 6/2010 | Urban ................ G07C 9/00309 380/46 |
| 8,374,091 B2 | 2/2013 | Chiang |
| 8,397,151 B2 | 3/2013 | Salgado et al. |
| 8,577,038 B2 | 11/2013 | Kameda et al. |
| 9,350,663 B2 | 5/2016 | Rankin |
| 10,725,743 B2 | 7/2020 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2003/0223582 A1 | 12/2003 | Dagan |
| 2005/0265126 A1 | 12/2005 | Izawa et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0028121 A1 | 2/2007 | Hsieh |
| 2007/0223395 A1 | 9/2007 | Lee et al. |
| 2010/0002868 A1 | 1/2010 | Willoughby |
| 2010/0103830 A1 | 4/2010 | Salgado et al. |
| 2011/0149891 A1 | 6/2011 | Ramakrishna |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0094650 A1 | 4/2013 | Mendel |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0113028 A1 | 4/2015 | Boppana et al. |
| 2015/0229714 A1 | 8/2015 | Venkatsubra et al. |
| 2016/0241388 A1 | 8/2016 | Ross |
| 2016/0269294 A1 | 9/2016 | Rankin |
| 2017/0090872 A1 | 3/2017 | Mathew et al. |
| 2017/0244560 A1 | 8/2017 | Brandstatter |
| 2017/0279603 A1 | 9/2017 | Chen et al. |
| 2018/0018147 A1 | 1/2018 | Sugawara |
| 2018/0102975 A1 | 4/2018 | Rankin |
| 2019/0265951 A1 | 8/2019 | Rankin et al. |
| 2020/0241960 A1 | 7/2020 | Yanovsky et al. |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

\* cited by examiner

SYSTEM AND METHOD FOR SECURE EXCHANGE

CROSS-REFERENCE TO RELATED APPLICATIONS

This application is a continuation in part of U.S. application Ser. No. 16/263,007 filed Jan. 31, 2019, which claims the benefit of U.S. Provisional Application Ser. No. 62/624,179 filed Jan. 31, 2018, the disclosures of each of which are hereby incorporated by reference in their entireties.

TECHNICAL FIELD

Exemplary embodiments of the present invention relate generally to systems and methods for secure exchanges of data.

BACKGROUND AND BRIEF SUMMARY OF THE INVENTION

Random Block Security (RBS) is a system of encryption where a block of random numbers is used to perform encryption by providing a block that is equivalent in size to the data for encryption. Since each byte of data is modified randomly, the resulting cypher is secure and cannot effectively be decrypted. This form of encryption is traditionally referred to as "the one-time pad" and was often used in espionage for encryptions that were highly sensitive. This system effectively has a key that is the size of the data being encrypted, and therefore is not usually practical for simplistic applications. However, this system is extremely valuable for the delivery of smaller bursts of information of a highly sensitive and covert nature.

In order for an encryption system designed for communication or other exchange to be successful, it is necessary that a large collection of random numbers be present on both sides of the exchange. Such random numbers should be equivalent in amount and value. This relatively large block of random numbers should be the size of the intended transmission or other data to be encrypted. It is possible to develop random numbers from a source and transmit them to the receiving exchange partner(s), however, this transmission may need to be encrypted as well, and equal in size as the ultimate data intended for secure transfer.

Computing machines operate with an amount of storage or memory. This area of machine-readable data is used to store programs, information, and variables for the machine's operation. The simplest form of a computing machine has only one execution process and only one area of memory storage; however, as machines have become more complex and the objective tasks have grown in variety, the number of processes executing within a machine have also increased.

Modern computing machines can now operate with multiple processes, all having access and interactive ability to common or shared memory; furthermore, several extensions to this computing model exist that allow multiple processes to execute on multiple processors, while maintaining access to the same common or shared memory. When these machines are loosely or tightly coupled, it is possible for processes executing on disparate machines to operate upon the same common or shared memory.

There are times when data needs to be encrypted within a closed or tightly coupled system, where the information is exchanged between processes, tasks, or processors. Where multiple processes on the same computing machine, or across multiple computing machines, have access to the same storage memory, there may be significant reasons why this memory should be encrypted. However, it is possible that some select processes need to exchange encrypted information. These processes may accomplish a secure exchange of information, without compromising the integrity of the data to any unauthorized process with similar access or availability to the storage memory.

Since any number of unknown processes may have access to the same memory storage, it is desirable to develop a method where data can be securely exchanged between trusted processes, while using storage that can be viewed by untrusted processes.

A system and method for secure exchange using random blocks or random numbers is provided. The system and method may utilize a block of random numbers for the security and encryption of transmissions over a communication or other exchange network by expanding the block into a larger set of random numbers. In exemplary embodiments, the random numbers used in the block are true random numbers. By transmitting a small set of random numbers, themselves secured by one or more random encryptions, a much larger volume of random values may be produced which may be mirrored on each side of the transmission. In this way, the end result of random values will provide enhanced security, such as but not limited to network security.

The system may start with a supply of blocks of random numbers. The originating process, along with any and all accessing processes, may have a single matching block with which to begin operation. This beginning block may be installed externally, or may be shipped or otherwise communicated as an encoded block within the routines operating in each process. A block may be selected from the source of blocks. The selected block may be encrypted and exchanged between the originating process and the accessing process(es). Once the block has been received, it may be decrypted and expanded onto two further blocks. The first further block may replace the starting block to use for subsequent block exchange. The second further block may be large enough to be used for secure data exchange.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
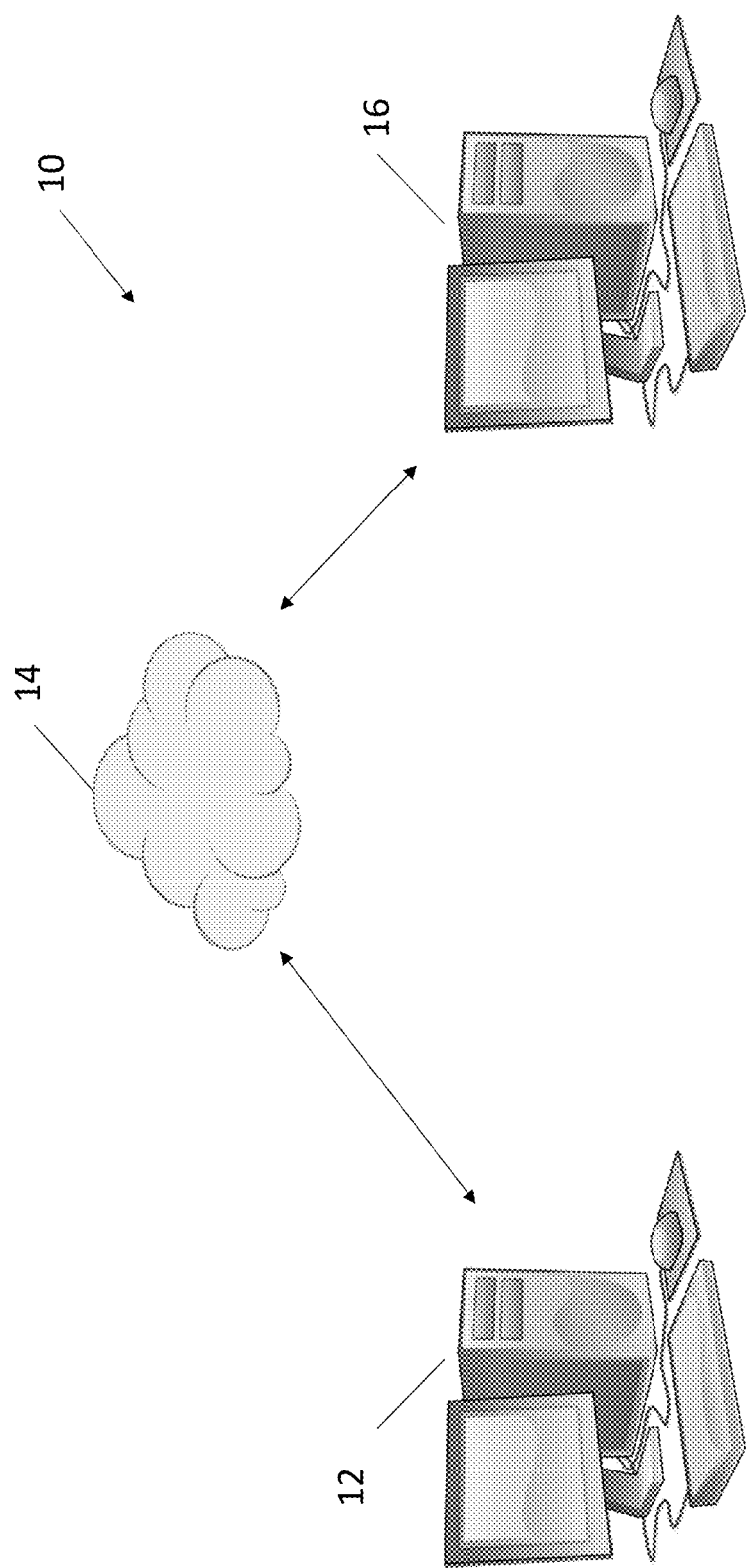
FIG. 1 is an exemplary communication system in accordance with the present invention.

FIG. 1 is an exemplary communication system 10 in accordance with the present invention. A first device 12 may be in communication with a second device 16. In exemplary embodiments, the first device 12 may be a sending device and the second device 16 may be a receiving device, though the reverse is contemplated. The first and second devices 12 and 16 may be electronic devices such as, but not limited to, personal computers, servers, databases, smartphones, tablets, or the like. The first and second devices 12 and 16 may be in wired or wireless electronic communication. In exemplary embodiments, the first and second devices 12 and 16 are in communication with one another by way of a network 14. The network 14 may be an IP network, the world wide web, an internet, an intranet, cellular network, some combination thereof, or the like. While two devices are illustrated, it is contemplated that any number of devices may be utilized and may be in communication with the same network 14, or a number of interconnected networks. Any of the devices may be utilized to transmit information and receive information.

Any and all of the devices 12 and 16 may comprise processors, electronic storage devices, network connectivity devices, and software instructions, which when executed, are configured to perform the operations and functions described herein.

Figure 2:
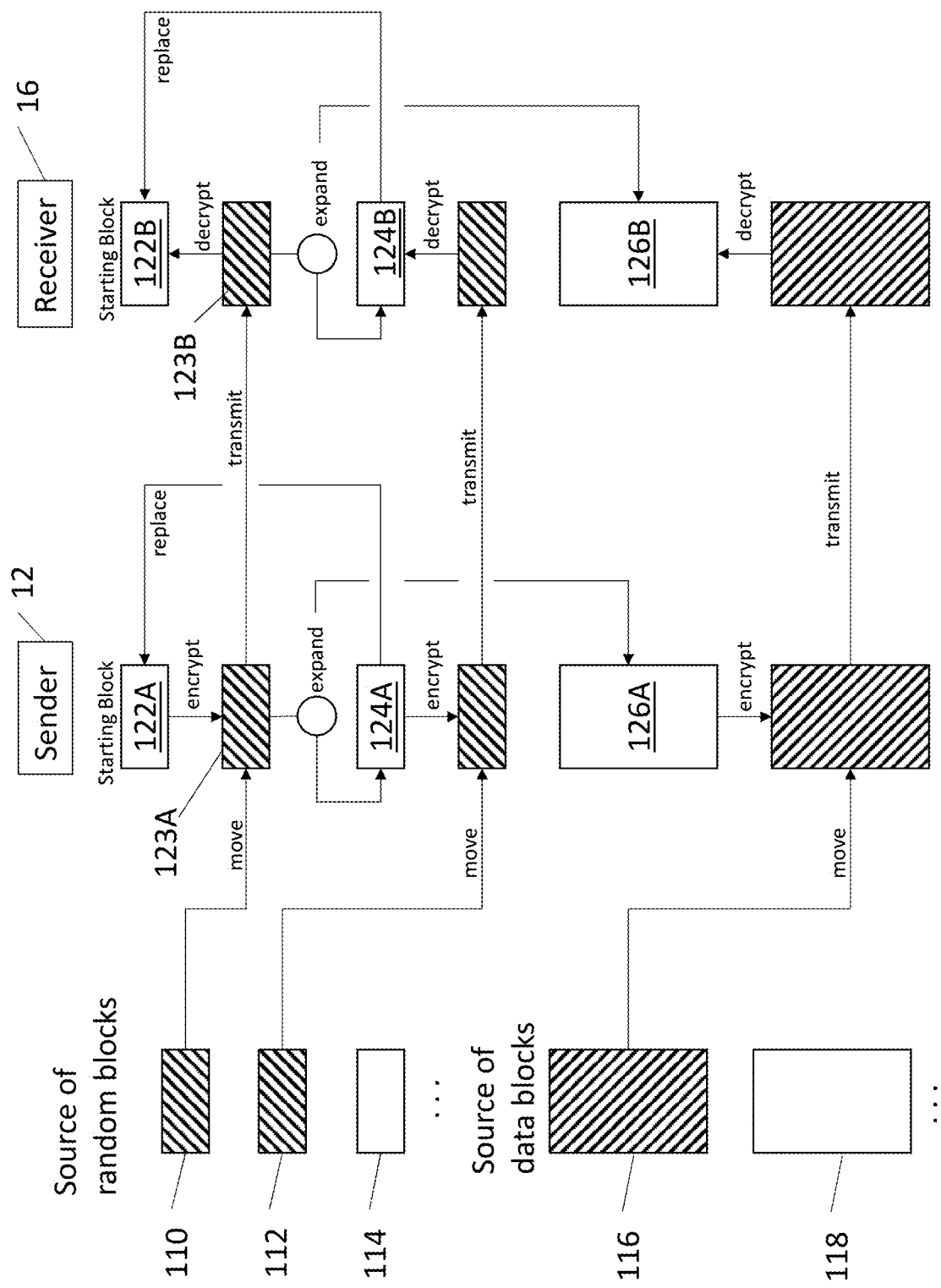
FIG. 2 is a simplified block diagram depicting the flow of random blocks and data blocks between and within a communication system of FIG. 1.

FIG. 2 is a simplified block diagram depicting the flow of random blocks and data blocks between and within the communication system 10 of FIG. 1. In order to facilitate a system and method of secure communication, devices 12 and 16 within the communication system 10 may comprise a supply of blocks of random numbers 110, 112, 114. While three blocks of random numbers are illustrated, it is contemplated that any number of blocks may be provided or subsequently generated. Each device 12 and 16 may receive a starting block 122A and 122B for beginning operation. In exemplary embodiments, the starting blocks 122A and 122B are a matched pair. This beginning starting block pair 122A and 122B may be installed externally or may be shipped as an encoded block within the routines. Focusing on the starting block 122A at the sending device 12, a random block may be selected from the source of random blocks 110, 112, and 114 and may be used to encrypt the starting blocks 122A and 1228. In the illustrated embodiment, random block 110 is selected, though this is merely exemplary and is not intended to be limiting.

The starting block 122A may be encrypted at the sending device 12 by use of the random block 110. The now encrypted starting block 123A may be transmitted to the receiving device 16 in the communication system 10 where it is received as encrypted block 1238. Once the encrypted starting data block 1238 is received at the receiving device 16, it may be decrypted for use. Additionally, the received encrypted starting block 1238 may be expanded into two further blocks: a first decrypted data block 1248 and a second decrypted data block 1268. The first decrypted data block 1248 may be configured to replace the starting block 1228 for use with subsequent transmissions. The second decrypted data block 1268 may be large enough to be used for secure data transmission of one or more source of data blocks 116 and 118 which may be located at the receiving device 16.

At the sending device 12, the encrypted starting block 123A may be expanded into a third decrypted data block 124A, which may replace the starting block 122A for subsequent transmissions, as well as a fourth decrypted data block 126A which may be large enough to be used for secure data transmission of the one or more source of data blocks 116 and 118 which may be located at the sending device 12.

The second fourth block 126A may be matched with one of the sources of data blocks 116 and 118. While two sources of data blocks 116 and 118 are illustrated, any number of blocks may be provided or subsequently generated for secure transmission. In the illustrated embodiment, source block 116 is selected, though this is merely exemplary and is not intended to be limiting. Source block 116 may be encrypted using the fourth decrypted block 126A and transmitted to the receiving device 16. Once received at the receiving device 16, the encrypted source block 116 may be decrypted using the decrypted starting block 122B.

Similarly, the second block 126B may be matched with one of the sources of data blocks 116 and 118. The source block 118, for example, may be encrypted using the second decrypted block 126B and transmitted to the sending device 12. Once received at the sending device 12, the encrypted source block 118 may be decrypted using the decrypted starting block 122A.

Since the starting block 122 is replaced by the first decrypted block 124 of the expansion, this process may be repeated for the entire transmission of the data blocks 116 and 118, so long as there is a sufficient stack of random blocks 110, 112, and 114 available at the sending device 12.

Expansion Process

Each random block 110, 112, and 114 may comprise two or more sets of random numbers. These sets of random numbers may be random in size, and both sets may be the same random size, though such is not required. These random sets may be denoted as:

Random Sets $[r_n, r_{n-1}, r_{n-2}, \ldots, r_2, r_1]$ $[d_n, d_{n-2}, \ldots, d_2, d_1]$ Where n=the number of random numbers within the given random block 110, 112, and 114, where there is a minimum number of two random numbers.

The expansion size of S, is the size required for a new starting block 122A and 1128, plus a block of numbers necessary to accommodate encryption of a given source of data block 116 and 118 for secure transmission. Therefore, if Y is a value of a random number to be included in the expansion, the formula for its production is:

$$Y_s = r_n d_n X^{n-1} + r_{n-1} d_{n-1} X^{n-2} + \ldots + r_2 d_2 X + r_1 d_1$$

Where X is the position within the expanded blocks. This formula may be repeated for every random number required for the expansion blocks 124 and 126. By utilizing real numbers as input to this process, and varying the number of random numbers within the process, the resulting cypher may be effectively secure, and an incalculable amount of processing would likely be necessary to detect any observable pattern within a given block. Since the overall transmission may utilize many individual blocks, the security would be effectively complete.

Figure 3:
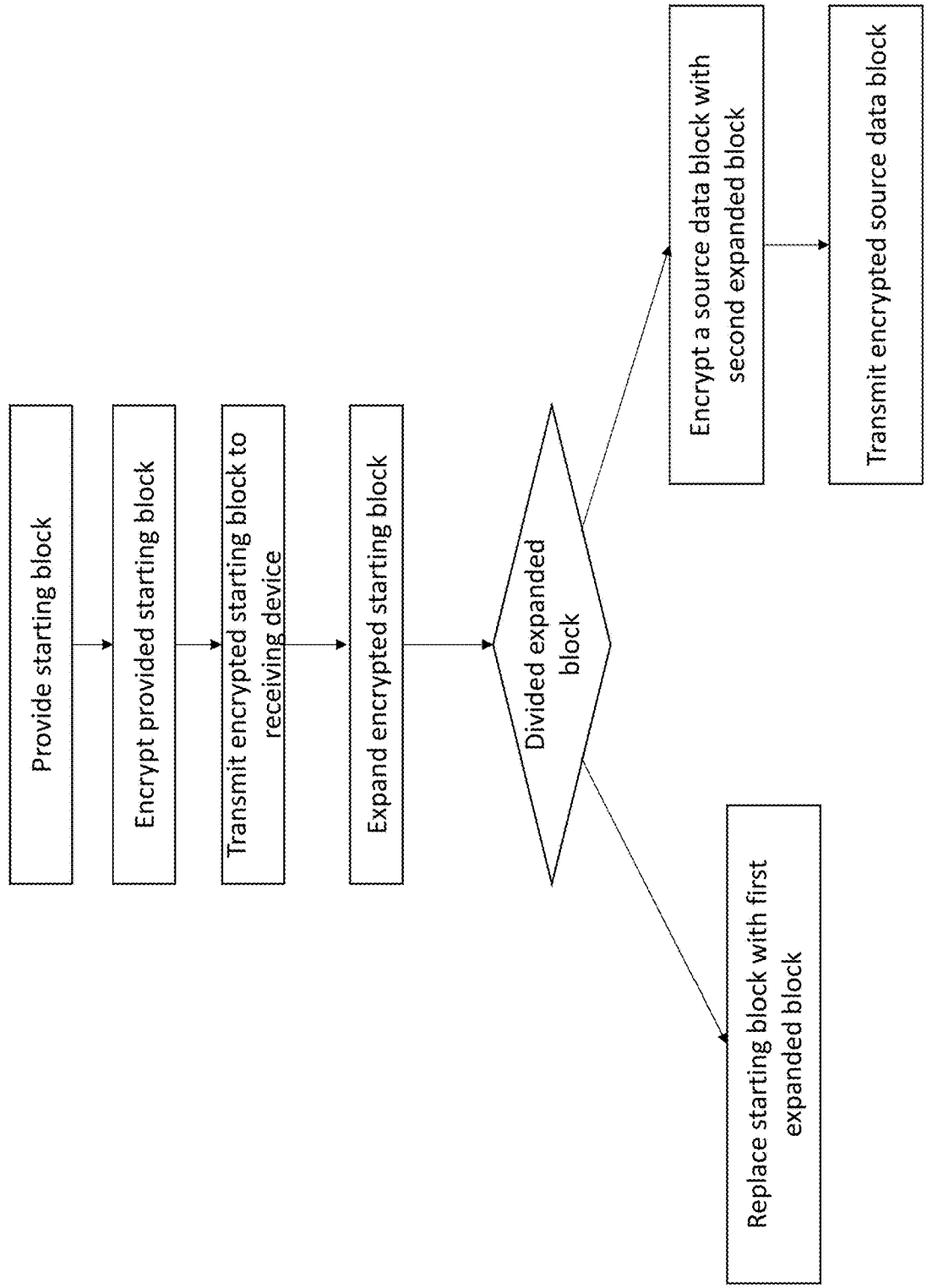
FIG. 3 is a flow chart illustrating exemplary logic for use with the system of FIGS. 1 and 2.

FIG. 3 is a flow chart illustrating exemplary logic for use with the system of FIGS. 1 and 2. A starting block 122A may be provided. The starting block 122A may be encrypted with any of the source random blocks 110, 112, or 114. The encrypted starting block 123A may be expanded by a random amount. In exemplary embodiments, the expansion size is an amount greater than or equal to the size of the source data block 116 or 118 to be securely transmitted plus the size of the starting block 122A. In exemplary embodiments, the exact amount of expansion is random over the minimum threshold. The expanded block may be divided into a first expanded block 124A and a second expanded block 126A. The first expanded block 124A may be configured to replace the starting block 122A for subsequent transmissions. The second expanded block 126A may be configured to encrypt one or the source data blocks 116 or 118. The now encrypted source data block 116 or 118 may be transmitted in a secure fashion from the sending device 12 to the receiving device 16.

The encrypted starting block 123A may also be transmitted from the sending device 12 to the receiving device 16 for decryption and use to decrypt the now encrypted source data block 116 and 118 at the receiving device 16.

The received encrypted starting block 123B may be expanded by an amount greater than or equal to the size of the source data block 116 or 118 to be securely transmitted plus the size of the starting block 122B. In exemplary embodiments, the exact amount of expansion is random over the minimum threshold. The expanded block may be divided into a first expanded block 124B and a second expanded block 126B.

The first expanded block 124B may be configured to replace the starting block 122B for subsequent transmissions. The second expanded block 126B may be configured to encrypt one of the source data blocks 116 or 118 for transmission back to the sending device 12. In this way, the now encrypted source data block 116 or 118 may be transmitted in a secure fashion back to the sending device 12 if desired. The encrypted starting block 123B may also be transmitted from the receiving device 16 to the sending device 12 for decryption and use to decrypt the now encrypted source data block 116 or 118 at the sending device 12.

The use of the designator "A" may signify operations or blocks used on the sending device 12 while the use of the designator "B" may signify operations or blocks used on the receiving device 16, though such is not required and it is contemplated that any of the so-designated items may be used with any device in the communications system 10.

Figure 4:
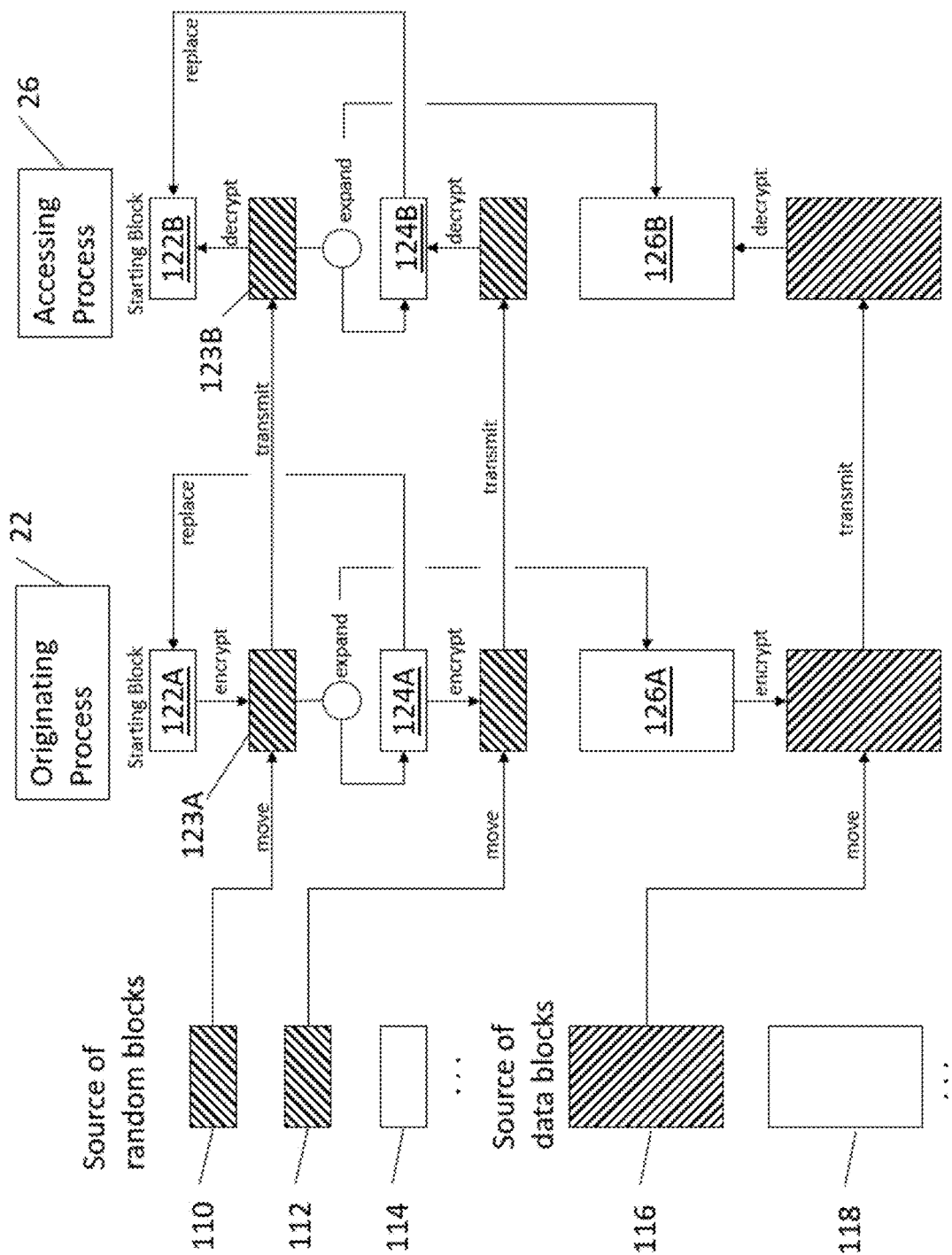
FIG. 4 is a simplified block diagram depicting the flow of random blocks and data blocks between originating processes and access processes.

FIG. 4 is a simplified block diagram depicting the flow of random blocks and data blocks between originating processes 22 and access processes 26. Since the starting block 122A or 122B may be replaced by the third decrypted data block 124A or the fourth decrypted data block 124B respectively, the steps, systems, and/or processes described herein may be repeated for any number of data blocks 116, 118, to facilitate, for example without limitation, the exchange of all data blocks 116, 118. A sufficient stack of random blocks 110, 112, 114 may be provided at the originating side 22 to facilitate the exchange.

The system may start with a supply of blocks of random numbers 110, 112, 114. The originating process 22, along with any and all accessing processes 26, may have a single matching block 112A, 112B with which to begin operation. This beginning block 112A, 112B may be installed externally, or be shipped or otherwise transmitted as an encoded block within the routines operating in each process 22, 26. A block 110 may be selected from the source of blocks 110, 112, 114. The selected block 110 may be encrypted into encrypted selected block 123A and may be exchanged between the originating process 22 and any number of accessing process(es) 26. Once the encrypted selected block 123A has been received, it may be decrypted and expanded onto two further blocks 124A and 126A, 124B and 126B. The first further block 124A, 124B may replace the starting block and may be utilized in subsequent block exchange. The second further block 126A, 126B may be large enough to be used for secure data exchange.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A method of using a relatively small block of random numbers to secure a relatively large area of storage, said method comprising the steps of:

providing a plurality of receiving processes with access to a common area of storage memory;

providing a starting block of random numbers with access to the common area of storage memory, wherein the starting block of random numbers is smaller in size than the common area of storage memory;

providing a source of random blocks comprising a plurality of blocks of random numbers, wherein each of the plurality of blocks of random numbers are equal in size to the starting block of random numbers, and wherein the source of random blocks is managed by a sending process that is exchanging information;

encrypting, at the sending process, a first one of the plurality of blocks of random numbers ("the first block"), with the starting block of random numbers;

transmitting the encrypted first block to each of the plurality of receiving processes;

decrypting, at each of the plurality of receiving processes, the encrypted first block with the starting block of random numbers;

expanding a second one of the plurality of blocks of random numbers ("the second block") with a formula, wherein said formula utilizes a random number of random numbers to increase the number of random numbers contained within the second block;

dividing the expanded second block into:
- a first subblock for subsequent exchanges of new random numbers; and
- a second subblock for encryption and decryption of some or all of the common area of storage memory.

2. The method of claim 1, wherein:
said sending process and each of said plurality of receiving processes are located within a single machine.

3. The method of claim 1, wherein:
said sending process is located at a first machine and at least one of the said plurality of receiving processes are located at a second machine, wherein each of said first and second machines have access to the common area of storage memory.

4. The method of claim 1, wherein:
the common area of storage memory is provided at a long-term external device.

5. The method of claim 4 wherein:
the long-term external device comprises a disk drive.

6. A method of using a relatively small block of random numbers to secure a relatively large transmission comprising the steps of:
providing a sending process and a receiving process;
creating a first block of random numbers at the sending process;
encrypting the first block of random numbers;
transmitting the first block of random numbers to the receiving process;
decrypting the first block of random numbers at the receiving process to create a second block of random numbers of equal size to the first block;
expanding the second block of random numbers with a formula that uses a random number of random numbers to increase the number of random numbers contained with the second block;
dividing the expanded second block into:
- a first expanded block configured for use in subsequent transmissions of new random numbers, and
- a second expanded block configured for use in data transmission of source data.

7. The method of claim 6, wherein:
the sending process and the receiving process are located at a common machine.

8. The method of claim 6, wherein:
the sending process and the receiving process are located at different machines.

9. The method of claim 6, wherein:
the sending process is located at a first machine; and
the receiving process is located at a second machine.

10. The method of claim 9, wherein:
the sending process and the receiving process are connected to one another by way of a network.

11. The method of claim 10, wherein:
the network comprises an IP network.

12. A method for secure communication comprising the steps of:
providing a common storage area comprising a first starting block, a first random block, and a first source data block;
providing a sender, wherein said sender has access to said common storage area;
providing one or more receivers, wherein each of said one or more receivers has access to said common storage area;
encrypting the first starting block with the first random block;
transmitting the encrypted first starting block to each of the one or more receivers;
decrypting the encrypted first starting block;
expanding the encrypted first starting block by a random amount greater than or equal to the size of the first source data block;
dividing the expanded first starting block into:
a first expanded block; and
a second expanded block sized to accommodate the first source data block;
encrypting the first source data block with the second expanded block;
transmitting the encrypted first source data block to each of the one or more receivers; and
decrypting the encrypted source data block with the decrypted first starting block.

13. The method of claim 12, further comprising the steps of:
replacing the first starting block with the first expanded block.

14. The method of claim 12, wherein:
the first expanded block is configured to be used with subsequent transmissions.

15. The method of claim 12, wherein:
the sender and each of the one or more receivers are located at a common machine.

16. The method of claim 12, wherein:
the sender is located at a first computing machine;
each of the one or more receivers are located at respective remote computing machines; and
each of the respective remote computing machines are in electronic communication with the first computing machine.

17. The method of claim 16, wherein:
the sender comprises a sending device; and
each of the one or more receivers comprise a respective receiving device.

18. The method of claim 16, wherein:
the sender comprises a sending process; and
each of the one or more receivers comprise a respective receiving process.

19. The method of claim 16, wherein:
the common storage area is located at a third computing machine remote from the first computing machine and each of the respective remote computing machines; and
the first computing machine and each of the respective remote computing machines are in electronic communication with the third computing machine.

20. The method of claim 19, wherein:
electronic communication between the first computing machine, each of the respective remote computing machines, and the third computing machine is accomplished by way of an IP network.

* * * * *